US006324619B1

(12) United States Patent
Raverdy et al.

(10) Patent No.: US 6,324,619 B1
(45) Date of Patent: Nov. 27, 2001

(54) PROCESS AND SYSTEM FOR MANAGING RUN-TIME ADAPTATION FOR GENERAL PURPOSE DISTRIBUTED ADAPTIVE APPLICATIONS

(75) Inventors: Pierre-Guillaume Raverdy, Santa Clara; Rodger J. Lea, San Jose, both of CA (US)

(73) Assignees: Sony Corporation of Japan, Tokyo (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/258,020

(22) Filed: Feb. 25, 1999

Related U.S. Application Data

(60) Provisional application No. 60/079,742, filed on Mar. 27, 1998.

(51) Int. Cl.[7] ........................................ G06F 9/445
(52) U.S. Cl. ................................................. 711/11
(58) Field of Search ........................ 717/11, 1, 3

(56) References Cited

U.S. PATENT DOCUMENTS

| 4,893,199 | 1/1990 | Okada ................................... 360/48 |
| 5,420,573 | 5/1995 | Tanaka et al. ................... 340/825.24 |
| 5,537,605 | 7/1996 | Teece .................................... 395/800 |
| 5,857,197 | * 1/1999 | Mullins ............................... 707/103 |

FOREIGN PATENT DOCUMENTS

| 2767795 | 3/1989 | (JP) | ............................... H04L/13/00 |

OTHER PUBLICATIONS

Oikawa S. et al., "Adaptive Object Management For A Reconfigurable Microkernel", Proceedings Int'l Workshop On Object Orientation in Operating Systems, Oct. 27, 1996, pp. 67–71.

E. Shokir et al., "Architecture of ROAFTS/Soaris: A Solaris–Based Middleware for Real–Time Object–Oriented Adaptive Fault Tolerance Support", Proceedings of the 2nd Annual Int'l Computer Software and Application Conference, COMPSAC 98, Vienna, Aug. 19–21, 1998, pp. 90–98.

Sony et al., Specification of the Home Audio/Video Interoperability (HAVi) Architecture, May 11, 1998.

Sony et al., Specification of the Home Audio/Video Interoperability (HAVi) Architecture, Nov. 19, 1998.

Amano, N. et al. LEAD++: An Object–Oriented Reflective Language for Dynamically Adaptable Software. Graduate School of Information Science, Japan Advanced Institute of Science Technology. Ishikawa, Japan. Presented at the OOPSLA Workshop on Reflective Programming in C++ and Java. Vancouver, British Columbia, Canada. Oct. 18, 1998.

(List continued on next page.)

Primary Examiner—Mark R. Powell
Assistant Examiner—Michael B. Holmes
(74) Attorney, Agent, or Firm—Wagner, Murabito & Hao LLP

(57) ABSTRACT

A method and system for managing run-time adaptation for general purpose distributed adaptive applications. Using the present software run-time environment, application designers would be able to quickly develop distributed adaptive software, such as network or web software, without having to deal with the details of the distribution and adaptation. To achieve both distribution and adaptation, meta-level object programming techniques and run-time monitoring techniques are applied. Importantly, a run-time adaptation manager is provided for configuring the application execution environments, and for managing adaptations for both reflective methods and adaptive methods. In addition, the adaptation manager coordinates the adaptation of multiple objects in a coherent manner by keeping track of instances of the adaptive classes and the platform services that they are using. The adaptation manager also records the adaptation policies and monitors the system state and user preferences. Based on the adaptation polices and the system state, the adaptation manager executes related policies and decides which, how, and when objects should be adapted.

19 Claims, 7 Drawing Sheets

OTHER PUBLICATIONS

Bakker, A. et al. Replicated Invocations in Wide–Area Systems. Proceedings of the Eighth ACM SIGOPS European Workshop. Sinta, Portugal. Sep. 1998.

Kermarrec, A.M. et al. A Framework for Consistent, Replicated Web Objects. Proceedings of the 18th International Conference on Distributed Computing Systems. Amsterdam, The Netherlands. May 1998.

Kleinöder, J. et al. Transparent and Adaptable Object Replication Using a Reflective Java. Technical Report TR–I14–96–07, Universität Erlangen–Nürnberg: IMMD IV, Sep. 1996.

Kuz, 1. et al. Replicated Web Objects: Design and Implementation. Proceedings of the Fourth Annual ASCI Conference. Lommel, Belgium. Jun. 1998.

Melliar–Smith, P.M. et al. The Realize Middleware for Replication and Resource Management. Presented at the Middleware IFIP International Conference on Distributed Systems Platforms and Open Distributed Processing. 1998.

Noble, B. et al. Agile Application–Aware Adaptation for Mobility. Proceedings of the 16th ACM Symposium on Operating System Principles, Saint–Malo, France, Oct. 5–8, 1997.

Oliva, A. et al. Composition of Meta–Objects in Guaraná. Laboratório de Sistemas Distribuídos, Instituto de Computação, Universidade Estadual de Campinas. Presented at the OOPSLA Workshop on Reflective Programming in C++ and Java. Vancouver, British Columbia, Canada. Oct. 18, 1998.

Satyanarayanan, M. et al. Application–Aware Adaptation for Mobile Computing. *Operating Systems Review*, 29(1), Jan. 1995.

Welch, I. et al. Dalang—A Reflective Java Extension. University of Newcastle upon Tyne, UK. Presented at the OOPSLA Workshop on Reflective Programming in C++and Java. Vancouver, British Columbia, Canada. Oct. 18, 1998.

Wu, Z. Reflective Java and A Reflective Component–Based Transaction Architect. AMP Ltd., Poseidon House, Castle Park, Cambridge, UK. Presented at the OOPSLA Workshop on Reflective Programming in C++ and Java. Vancouver, British Columbia, Canada. Oct. 18, 1998.

* cited by examiner

PROCESS AND SYSTEM FOR MANAGING RUN-TIME ADAPTATION FOR GENERAL PURPOSE DISTRIBUTED ADAPTIVE APPLICATIONS

RELATED APPLICATION

The present application claims the benefit of U.S. Provisional Patent Application Ser. No. 60/079,742, filed Mar. 27, 1998, entitled "Distributed Adaptive Run-Time Software Environment," which is hereby incorporated by reference.

BACKGROUND OF THE INVENTION (1) Field of the Invention

The present invention relates generally to the field of computer software. More particularly, the present invention relates to the field of software platforms for distributed applications.

(2) Background Art

Development in software technology has allowed computers to perform a wide variety of useful operations. Depending on the software which is installed within their particular memory storage devices, computers can be used for many purposes. For example, they can be used to manage numerous financial transactions of a bank, control the fabrication of items ranging from automobiles down to integrated circuit chips, store addresses and telephone numbers of acquaintances, analyze scientific and engineering data, produce and edit documents, along with transmitting and receiving data. The functionality and usefulness of a computer system is further enhanced by networking computer systems together.

The Internet has also been made possible by recent advances in hardware and software technology. The Internet is a worldwide collection of computer networks and gateways that use the TCP/IP suite of protocols to communicate with one another. Millions of people use the Internet for communication and entertainment. The Internet is also rapidly evolving as new kinds of networks (e.g., wireless networks, home networks) are added to the Internet to provide new functionalities such as digital broadcast and telephony. The continuous growth in popularity and functionality of the Internet appears promising for large-scale distributed software applications. However, strong barriers prevent their deployment.

Developing large-scale distributed software applications is an intricate and time-consuming process that often requires software designers to develop a full set of services for managing distributed processes such as synchronization and communication between software modules. In addition, when developing a distributed application, it is difficult to predict the latency and communications medium in which it will be used. It is also impossible to predict the number of people that will use the distributed application. Properties like persistency, fault-tolerance and replication, which are typically present in distributed applications, are complex software procedures that are inherently difficult to implement.

In recent years, a number of technologies have been developed to ease the development process in this field. These technologies, such as distributed objects and distributed systems (e.g., Common Object Request Broker Architecture CORBA), simplify the process of creating distributed software applications by abstracting away the complexities of a distributed network environment from the programmer. Nevertheless, many issues in developing distributed applications remain unaddressed. One of the problems applications designers still face is that it is difficult to control the performance of a distributed application. Numerous factors such as format, content and size of an audio/video stream, or the effective mobility and connectivity of a mobile computer, may greatly affect the speed and efficiency of the application. Other factors, such as undocking a mobile computer, may prompt an associated distributed application to perform communication encryption and to adjust its consistency protocols. Changes in one or several of these factors require a quick and appropriate adaptation of the application to deliver the performance expected by the user.

In order to meet these requirements, distributed applications need to be adaptive. Their adaptability should address a wide range of areas and should be sufficiently flexible to allow quick adaptation. One solution is to build adaptive behaviors into individual applications. However, that solution is not feasible because the burden imposed on programmers would be too great. Rather, what is needed is a general application framework that allows an application to provide quick and appropriate adaptation. What is further needed is a method of developing adaptive distributed applications in a relatively abstract and intuitive manner.

SUMMARY OF THE DISCLOSURE

Accordingly, an adaptive software platform for general purpose distributed applications is provided in accordance with the present invention. According to one embodiment of the present invention, adaptive mechanisms are built into the run-time environment along with a set of services that support aspects of distributed programming. Particularly, the built-in adaptive mechanisms of the run-time environment allow a distributed application to react to changing system, network and application characteristics. These and other advantages of the present invention not specifically mentioned above will become clear within discussions of the present invention presented herein.

According to one embodiment of the present invention, the software platform provides support for two adaptation mechanisms: reflective methods and adaptive methods. Reflective methods allow a designer to customize the execution environment of an object at run-time, and adaptive methods allow a designer to provide several implementations for the same method and choose the most effective implementation at run-time. By supporting both reflective methods and adaptive methods, large-scale distributed applications can be readily developed on the software platform used by the present invention.

In furtherance of the present invention, the software platform further includes an adaptation manager for configuring and managing the distributed application's execution environment. In addition, the adaptation manager coordinates the adaptation of multiple objects in a coherent manner by keeping track of instances of the adaptive classes and the platform services that they are using. The adaptation manager also records the adaptation policies and monitors the system state and user preferences. Based on the adaptation polices and the system state, the adaptation manager executes related policies and decides which, how, and when objects should be adapted.

In order to offer application designers a straight forward and intuitive access to the platform services, the present invention further comprises a compiler for assisting application designers in writing the complex code required by the platform, and for providing an easy access to services provided by the platform. Particularly, the compiler parses the source codes of an application and translates pre-defined keywords into codes that are necessary for carrying out reflective and adaptive methods.

Embodiments of the present invention include the above and further include a system for managing run-time adaptation in distributed adaptive software applications and comprising: means for generating a software selector for a first adaptive object of the adaptive software application, the first adaptive object having an adaptive method, wherein the adaptive method comprises a plurality of implementations; means for selecting one of the implementations with the software selector according to predetermined adaptation policies; means for executing the selected implementation provided that the adaptive method is called; means for generating a reflector for a second adaptive object of the adaptive software application, the second adaptive object having a reflective method and a plurality of meta-objects; means for selecting one of the meta-objects with the reflector according to predetermined adaptation policies; and means for executing the selected meta-object provided that the reflective method is called.

BRIEF DESCRIPTION OF THE DRAWINGS

The accompanying drawings, which are incorporated in and form a part of this specification, illustrate embodiments of the present invention and, together with the description, serve to explain the principles of the invention.

DETAILED DESCRIPTION OF THE PREFERRED EMBODIMENTS

Figure 1:
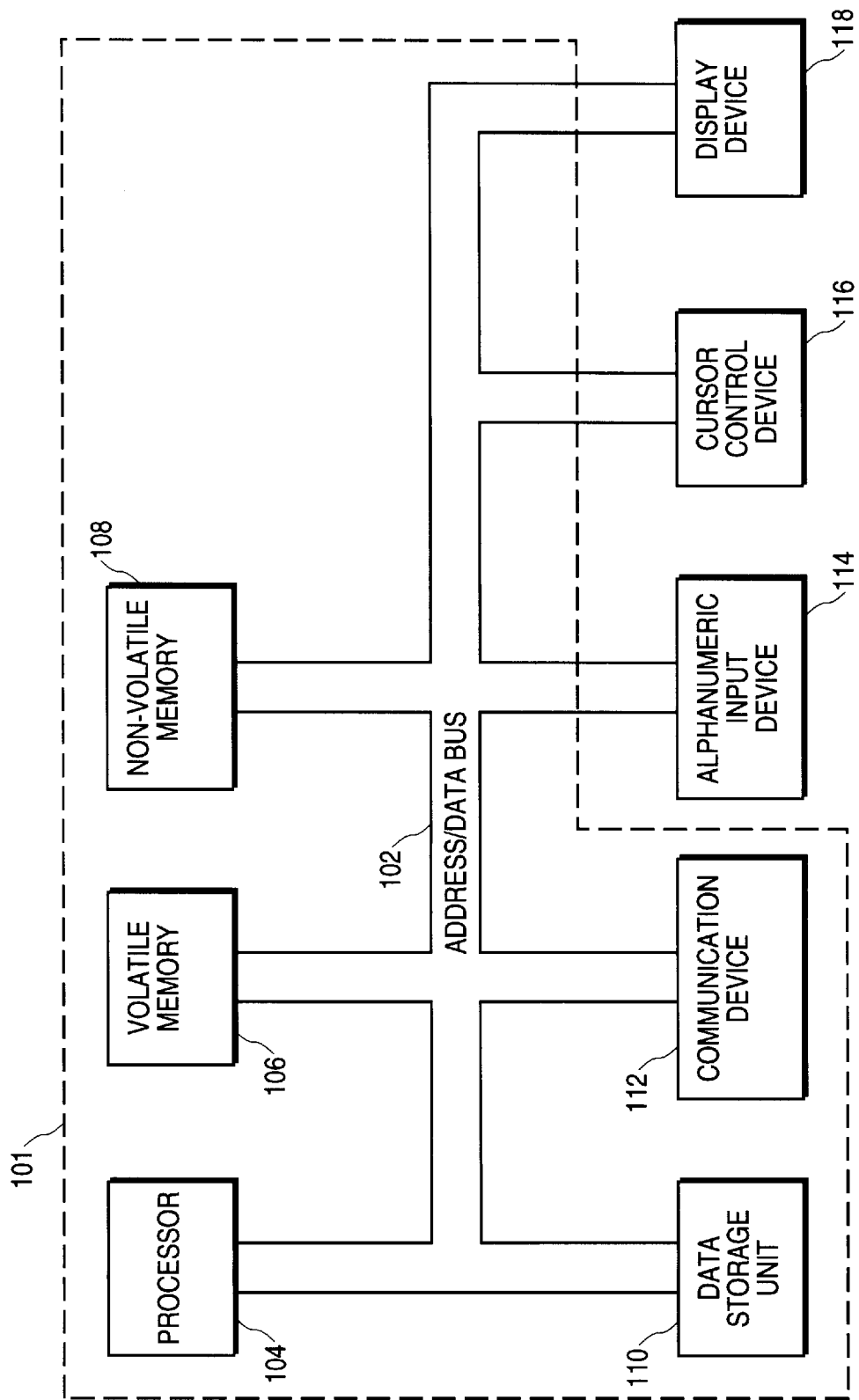
FIG. 1 is a logical block diagram illustrating an exemplary general purpose computer system in which different embodiments of the present invention can be implemented.

Reference will now be made in detail to the present embodiments of the invention, examples of which are illustrated in the accompanying drawings. While the invention will be described in conjunction with the present embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be recognized by one skilled in the art that the present invention may be practiced without these specific details. In other instances, well known methods, procedures, components, and circuits have not been described in detail as to avoid unnecessarily obscuring aspects of the present invention.

I. Notation and Nomenclature

Some portions of the detailed descriptions which follow are presented in terms of steps, procedures, logic blocks, processing, and other symbolic representations of operations on data bits within a computer memory. These descriptions and representations are the means used by those skilled in the data processing arts to most effectively convey the substance of their work to others skilled in the art. A procedure, logic block, process, step, etc., is here, and generally, conceived to be a self consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "generating", "parsing", "extending", "calling", "executing", or the like, refer to the actions and processes of a computer system or similar electronic computing device. The computer system or similar electronic device manipulates and transforms data, represented as physical (electronic) quantities within the computer system's registers and memories, into other data, similarly represented as physical quantities within the computer system memories, into other data similarly represented as physical quantities within the computer system memories or registers or other such information storage, transmission, or display devices.

II. Computer System Environment

Aspects of the present invention, described below, are discussed in terms of steps executed on a computer system. Although a variety of different computer systems can be used with the present invention, an exemplary computer system platform 101 is shown in FIG. 1.

In general, computer systems 101 that can be used by the present invention include an address/data bus 102 for communicating information, a central processor 104 coupled with bus 102 for processing information and instructions, a volatile memory 106 (e.g., random access memory RAM) coupled with the bus 102 for storing information and instructions for the central processor 104 and a non-volatile memory 108 (e.g., read only memory ROM) coupled with the bus 102 for storing static information and instructions for the processor 104. Computer system 101 also includes a data storage device 110 ("disk subsystem") such as a fixed or removable magnetic or optical disk and disk drive coupled with the bus 102 for storing information and instructions. Data storage device 110 can include one or more removable magnetic or optical storage media (e.g., diskettes, tapes)

which are computer readable memories. Computer readable memory units of system 101 thus include 106, 108 and 110.

Computer system 101 may further include a communication device 112 (e.g., a modem, or a network interface card NIC) coupled to the bus 102 for interfacing with other computer systems or the Internet. Also included in computer system 101 of FIG. 1 is an optional alphanumeric input device 114 including alphanumeric and function keys coupled to the bus 102 for communicating information and command selections to the central processor 104. Computer system 101 also includes an optional cursor control or directing device 116 coupled to the bus 102 for communicating user input information and command selections to the central processor 104. An optional display device 112 can also be coupled to the bus 102 for displaying information to the computer user. Display device 112 may be a liquid crystal device, other flat panel display, cathode ray tube, or other display device suitable for creating graphic images and alphanumeric characters recognizable to the user.

Cursor control device 116 allows the computer user to dynamically signal the two dimensional movement of a visible symbol (cursor) on a display screen of display device 112. Many implementations of cursor control device 116 are known in the art including a trackball, mouse, touch pad, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. The present invention is also well suited to directing a cursor by other means such as, for example, voice commands.

III Platform Architecture of the Present Invention

In accordance with the present invention, a software platform for adaptive distributed applications is provided. In one embodiment, the software platform is embodied as computer instructions stored in computer-usable memories 106, 108 or 110 in the form of computer readable codes. One particular embodiment of the present invention, known as DART (Distributed Adaptive Run-Time), is discussed herein.

In accordance with the present embodiment, adaptation within DART is achieved by the use of a meta-object programming model. By using a meta-object programming model, DART provides a clean set of mechanisms for software developers to build adaptive distributed applications. Additionally, the meta-object programming model allows a distributed application to work well in a constantly changing environment such as the Internet. Moreover, meta-programming allows an application developer to develop an application for one environment, e.g. the Internet, and then readily port the application effortlessly to another environment such as a low-bandwidth mobile network without rewriting or reconfiguring the application. Yet another benefit of the present invention is that it allows a system node to dynamically reconfigure itself to meet the changing requirements of an application.

A. Dart Adaptation Mechanisms

According to the present invention, adaptation may be achieved with the following approaches: (1) changing the implementation of an object at run-time; and (2) dynamically extending an object with general properties during run-time. The present invention provides two mechanisms for handling these adaptation approaches. In furtherance of the present invention, the first adaptation approach is referred to as adaptive methods and the second adaptation approach is referred to as reflective methods. Adaptive methods are typically used when the application's functional code itself has to adapt to environment changes. On the other hand, reflective methods are typically used when environments evolution changes how an application is executed.

Adaptive Methods

Figure 2:
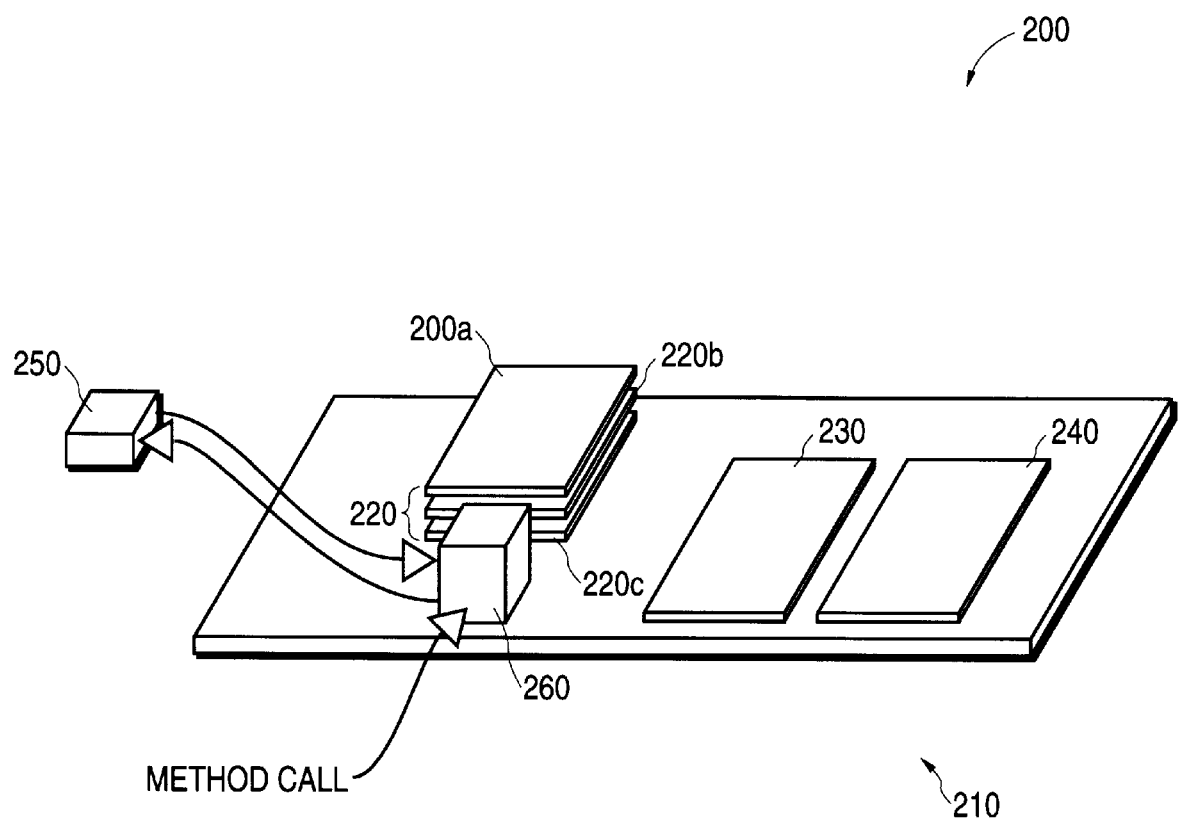
FIG. 2 is a logical block diagram illustrating the operations of an adaptive method in accordance with one embodiment of the present invention.

FIG. 2 is a logical block diagram 200 illustrating the operations of an adaptive method in accordance with one embodiment of the present invention. As illustrated, an adaptive object 210 is implemented with one adaptive software method 220 and two non-adaptive software methods 230 and 240 illustrated as logical blocks. The adaptive method 220 includes three implementations 220a–220c. Non-adaptive methods 230 and 240 can be accessed externally by other objects. The implementations 220a–220c, however, are not directly accessible externally from other objects. Rather, access to implementations 220a–220c are controlled by a switching software wrapper 260 and a software selector 250 which contains a reference to one of the implementations 220a–220c. As illustrated, when the adaptive method 220 is called, switching wrapper 260 asks the selector 250 which implementation it should execute, and executes the selected one of the implementations 220a–220c according to the reference stored within selector 250.

According to the present invention, adaptive method allows a programmer to handle adaptation directly within the application by providing several implementations with different properties for the same method. Significantly, the present invention provides a compiler for allowing software developers to implement adaptive methods in application programs in a straight forward and intuitive manner. In addition, the present invention provides an adaptation manager for managing such adaptive methods during run-time.

Reflective Methods

Figure 3:
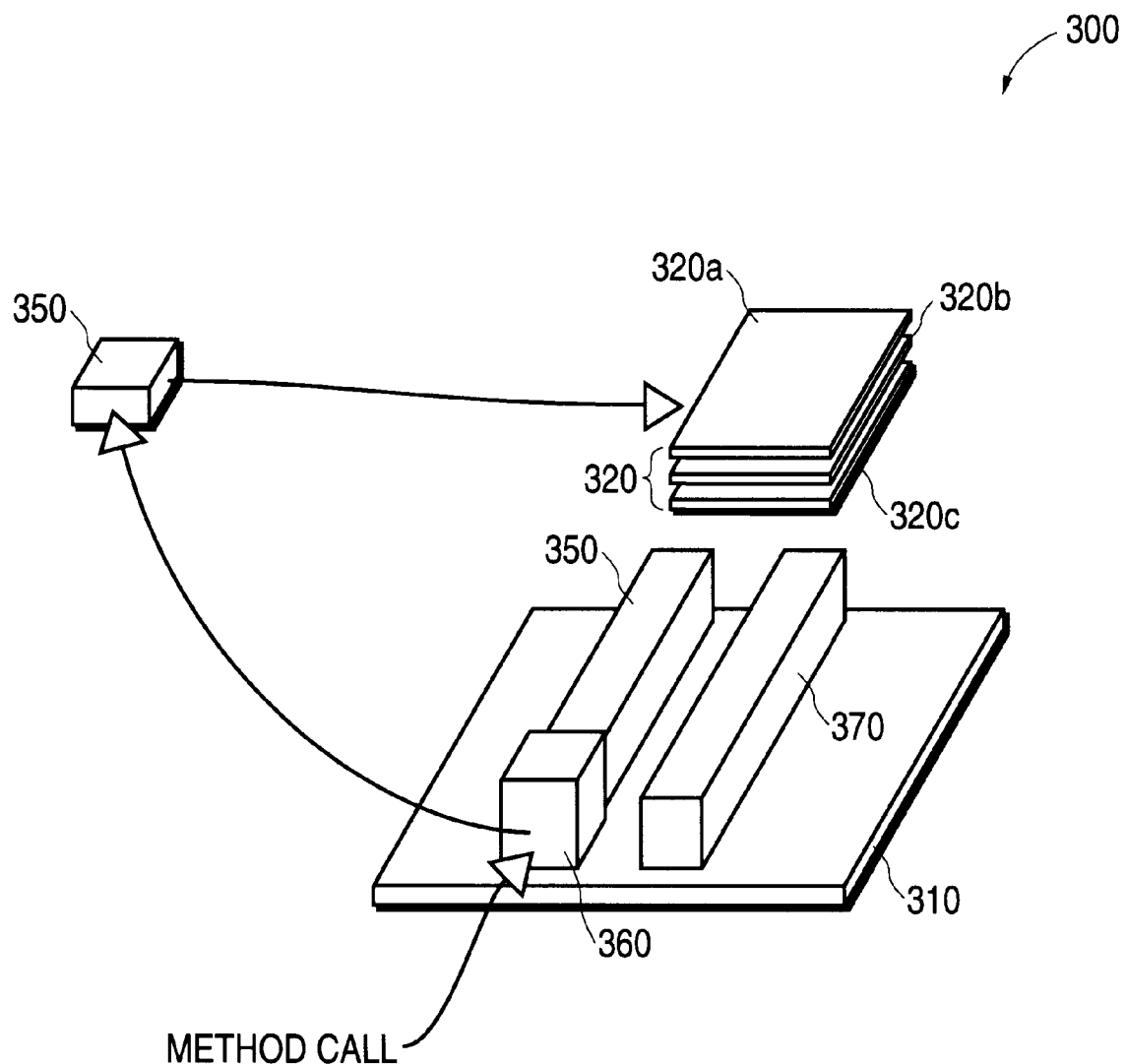
FIG. 3 is a logical block diagram illustrating the operations of a reflective method in accordance with one embodiment of the present invention.

FIG. 3 is a logical block diagram 300 illustrating the operations of a reflective method in accordance with one embodiment of the present invention. As illustrated, a base object 310 is associated with a meta-space 320 composed of three meta-level objects 320a–320c. According to the present invention, the meta-level objects 320a–320c of the meta-space 320 provide general services independently from an application's implementation details. Base level object 310 includes a reflective software method 350, a software meta-wrapper 360, and a non-reflective software method 370 illustrated as logical blocks.

In operation, non-reflective method 370 can be accessed externally by other data objects. However, when reflective method 350 is called, meta-wrapper 360 calls the reflector 370 and provides it with information and parameters of the method called. The reflector 370 then sequentially executes all meta-objects 320a–320c within the base-object meta-space 320. It should be noted, however, that some of the meta-objects 320 can be set as inactive and thus will not be called.

According to the present invention, a reflective method allows a programmer to customize the features of the execution environment of an object at run time. For example, meta-object 320a may be a replication meta-object. In that case, whenever reflective method 350 is called, meta-object 320a, if selected, will be automatically executed to replicate the base object 310. Significantly, the present invention provides for a compiler for allowing software developers to implement reflective methods in application programs in a straight forward and intuitive manner. In addition, the present invention provides for an adaptation manager for managing such reflective methods during run-time.

Adaptation Manager

In accordance with the present invention, an adaptation manager is provided for coordinating and managing run-time adaptations. In one embodiment, when a DART application starts, the adaptation manager is created and initialized with adaptive information of the application. The adaptation manager is thus aware of the different adaptive classes within the application and the available meta-level objects for those classes. At run-time, each instance of the adaptive classes registers itself to the adaptation manager and, depending on the features of the adaptive classes, the adaptation manager creates the reflectors/selectors, and initializes the meta-space with the relevant meta-level objects.

Figure 4:
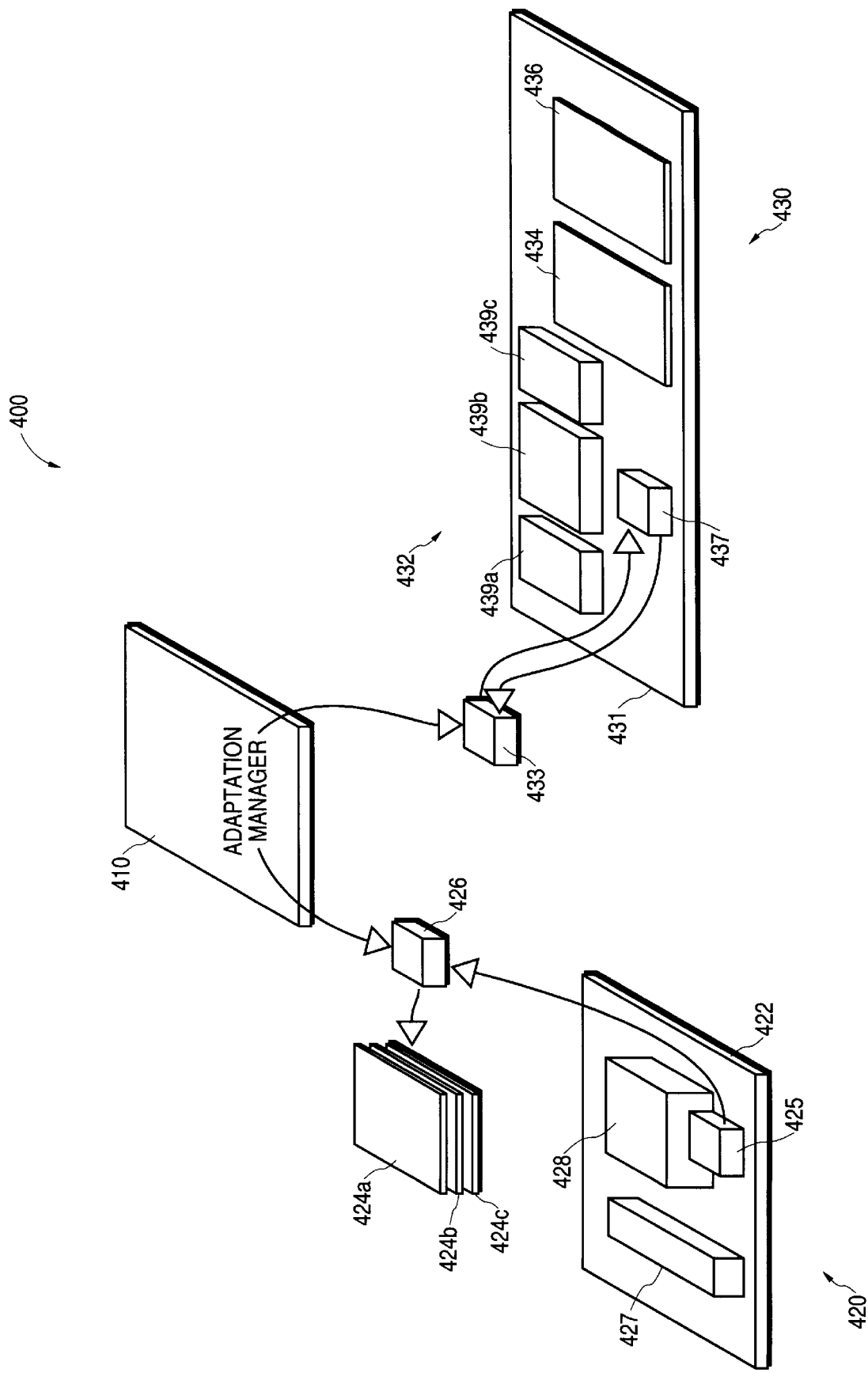
FIG. 4 is a logical block diagram illustrating the operations of an adaptation manager according to one embodiment of the present invention.

FIG. 4 is a logical block diagram 400 illustrating the operations of an adaptation manager 410 according to one embodiment of the present invention. As illustrated, adaptation manager 410 coordinates adaptation of two different adaptive objects 420 and 430. Adaptive object 420 includes a base object 422, meta-objects 424a–424c, a meta-wrapper 425, and a reflector 426. Adaptive object 430 includes a base object 431, a software selector 433, a software switching wrapper 437, an adaptive method 432 and two non-adaptive methods 434 and 436 illustrated as logical blocks. Adaptive method 432 further includes three implementations 439a–439c which are selected by software selector 433.

Significantly, as illustrated in FIG. 4, reflector 426 and selector 433 can be directly accessed by the adaptation manager 410. For instance, adaptation manager 410 may alter the reflector 426 to point to meta-object 424a such that, whenever reflective method 428 is called, meta-object 424a will be executed. As another example, adaptation manager 410 may alter the selector 433 to point to implementation 439c. Then, if adaptive method 432 is called, implementation 439c will be executed. Thus, the adaptation manager 410 provides a software mechanism to access the adaptive objects 420 and 430, and provides a software mechanism to alter reflector 426 or a selector 433 during run-time. This architecture allows an efficient jump to the meta-space and adaptive method call, while preserving fine adaptation (e.g., synchronized changes, and shared meta-spaces). According to the present invention, the adaptation manager 410 may also manage groups of adaptive objects at the same time.

B. Dart Compiler

One significant advantage of the software platform of the present invention is that application designers can access the platform services in an easy and intuitive manner. According to the present invention, a DART compiler, in one example based on OpenC++, is provided to automatically generate the low-level codes necessary for implementing adaptive methods and reflective methods from a few simple keywords embedded in a DART application source file. The DART compiler of the present invention enables a relatively seamless and transparent use of platform services to help programmers concentrate on the high-level design of the application, rather than the low-level mechanisms related to distribution and adaptation.

Adaptive Class Definitions

According to the present invention, an application designer may embed DART keywords within a DART application to describe and define the adaptive classes (e.g., which methods are reflective or adaptive, and the properties of the different implementations). Particularly, in one embodiment, the DART keywords are identified in the application source codes by the pre-fix "DART_". According to the one embodiment, adaptive classes are identified by the DART keyword "DART_Class," reflective methods are identified by the DART keyword "DART_Reflective," adaptive methods and their implementations are identified by the DART keywords "DART_Adaptive" and "DART_Impl." The identifiers are described because the DART compiler of the present invention, upon encountering the DART keywords, automatically generates all necessary codes for setting up the reflectors/selectors and the adaptation manager, and for managing multiple implementations and meta-spaces. Additional methods necessary for supporting adaptation, such as introspection and alteration methods, are also added to the application source code by the DART compiler.

Using the present DART compiler, the programmer can readily implement reflective methods by specifying the composition of the default meta-space of the class and by specifying the methods that are reflective. Adaptive methods can also be implemented by specifying the different implementations with their respective properties. The DART compiler then automatically extends a constructor of the base class to handle reflective and adaptive methods. Particularly, the DART compiler extends the constructor of the base class so that each time a new object of an adaptive class is created, the new object will create its associated reflector and selector for each of the defined adaptive methods. The constructor of the base class is also extended so that the new object will register itself to the run-time adaptation manager.

In addition, the DART compiler automatically extends a destructor of the base class such that each time a new object is terminated, the newly terminated object will delete its associated reflector and selector for each of the defined adaptive methods, and unregister itself from the run-time adaptation manager.

Two exemplary DART classes, "Counter" and "VideoFilter," are shown in Tables 1 and 2, respectively, to illustrate the adaptive class definitions in accordance with the present invention.

TABLE 1

```
DART_Class class Counter {
    DART_MSSetDefault DART_LGP;
    private:
    int cpt;
public:
    Counter();
    DART_Reflective        void Incr();
    DART_Reflective        void Decr();
    DART_Reflective        int Val();
    DART_Reflective        void Set(int val);
};
```

Table 1 illustrates an exemplary adaptive class "Counter" for a distributed application program. As shown, an application developer has selected the meta-object "DART_LGP" as being the default meta-object of the meta-space associated with the class Counter. The methods "Incr( )," "Decr( )," "Val( )," and "Set" are all defined to be reflective methods of the class "Counter." Thus, in accordance with the present invention, each time one of the reflective methods (e.g., Incr( ), Decr( ), Val( ), and Set) is called, the "DART_LGP" meta-object will be automatically executed. In this example, the DART_LGP meta-object automatically maintains the consistency of a replicated instance of the class Counter whenever one of the reflective methods is called. In this way, an application designer does not have to be concerned with the particular details of implementing an adaptive application. Rather, the codes that an application developer needs to add are minimal, and are representative of high-level information on the application's adaptation requirements.

TABLE 2

| DART_Class | class VideoFilter { | |
|---|---|---|
| Stream | * st; | |
| VideoFilter (); | | |
| DART_Adaptive | (Send_BW) | int Send (group *dest); |
| DART_Impl | | int Send_BW (group *dest); |
| DART_Impl | | int Send_COL (group *dest); |
| DART_Property | Send_BW | (NETWORK_BANDWIDTH, LOW); |
| DART_Property | Send_COL | (NETWORK_BANDWIDTH, HIGH); |

Table 2 illustrates a DART class "VideoFilter" for a distributed video application program. As shown, the VideoFilter class includes one adaptive method "Send" that has been defined with two implementations "Send_BW" and "Send_COL." According to the present exemplary DART class, the adaptive method "Send" allows an application to send an image in black and white (Send_BW) when the network bandwidth is low, or in color (Send_COL) when the network bandwidth is high. Further, as illustrated in Table 2, the method "Send_BW" has been selected as the default implementation. Thus, whenever the adaptive method "Send" is called, the implementation Send_BW will be executed. Significantly, according to the present invention, the intricate details of implementing adaptation are removed from the application developers. The DART compiler automatically generates the codes necessary for setting up the adaptation manager and for managing the multiple implementations.

Figure 5:
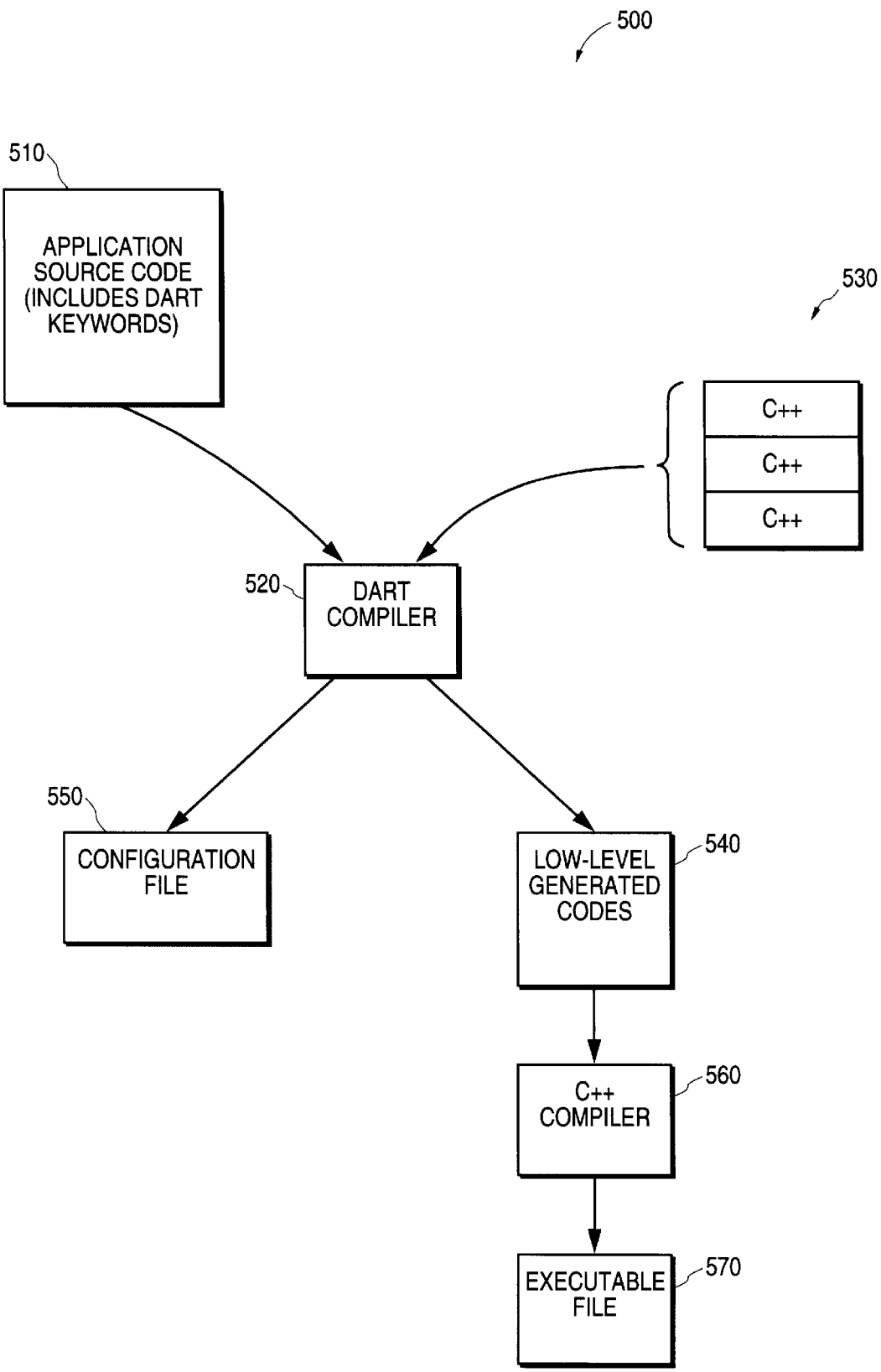
FIG. 5 is a logical block diagram illustrating the operations of the Distributed Adaptive Run-Time (DART) compiler in accordance with one embodiment of the present invention.

FIG. 5 is a logical block diagram 500 illustrating the process of compiling a DART application using the DART compiler of the present invention. As illustrated, an application source file 510 containing DART keywords (e.g., DART classes "Counter" and "VideoFilter" of Tables 1 and 2) is provided to DART compiler 520. In addition, a number of adaptive service implementation files 530, which contain a set of pre-defined rules for processing the DART keywords, are also provided to the DART compiler 520. The DART compiler 520 then generates low-level generated source codes 540 and a configuration file 550. The low-level generated source codes 540, which contain repetitive and error prone codes for generating an adaptation manager, are then provided to a general C++ compiler (e.g., gcc) to be compiled into an executable file 560. The configuration file 550 is used to provide initialization information to the adaptation manager during run-time. An exemplary low-level generated source code generated by the DART compiler for the DART class Counter is included in Table 5.

It should be noted that, after the DART compiler transforms the source code, the names of the non-reflective methods remain unchanged, but the names of the reflective methods are changed from "X" to "BaseLevel_X," and a meta-wrapper with the name X is inserted in the class definition. Thus, if the method "obj->X" is called in the source code, the meta-wrapper will be called after it is compiled by the DART compiler.

In furtherance of one embodiment of the present invention, meta-space calls may be performed before and/or after the base-level method is executed. Thus, in the present invention, meta-level objects are C++ objects that provide at least two methods for before and after meta-space calls. Further, in order for the meta-level objects to function correctly, the meta-level objects often need to introspect the base object to obtain parameters such as the names of the called methods, values and types of variables, etc. In the present invention, introspection methods and alteration methods are automatically generated by the DART compiler, and are inserted in the generated source codes when an adaptive class is processed. In furtherance of the present invention, the introspection methods and alteration methods allow identifying, accessing, and modifying any member variable of the base object. In addition, the introspection methods and alteration methods allow a meta-object to execute any method of the base-object or marshall/unmarshall the state of the object. Further, in order to allow meta-objects to access the intropsection methods and alteration methods of the base level, the DART compiler also inserts an intermediate structure that links the meta-space to the base-level object and allows any meta-object to access the introspection methods and the alteration methods at the base level in the generated source code.

C. Coherent Run-Time Adaptation Management According to the Present Invention

According to the present invention, it is advantageous to coordinate adaptation of multiple objects of an application in a coherent manner. In the present invention, coherent and consistent run-time adaptation management is achieved with three run-time components:

(1) adaptation events that are generated depending on system statistics, user requirements, etc.;

(2) adaptation policies that react to some specific events and are applied to specific objects; and, (3) an adaptation manager that triggers appropriate adaptation policies depending on the events it receives, and controls the adaptation performed to avoid instability and inconsistency.

Adaptation Events and Adaptation Policies

When a large number of adaptive objects are sharing the same basic resources, it is important to adapt them in a consistent manner such that instability can be avoided. For instance, for a video conferencing application having an adaptive video channel object and an adaptive audio channel object, it may be desirable to adapt the video channel object first before adapting the audio channel object. In this way, problems such as over-correction, or ping-pong effects, may be avoided.

Thus, in order to provide consistent adaptation among multiple adaptive objects, the present software run-time platform provides a set of "system level" adaptation events that represent a change in the system, and allows users to define "system level" adaptation policies that react on these events in the applications. According to the present invention, the adaptation events may be generated externally by various components such as system statistics servers, the user control panel, or internally by any objects that can access the adaptation manager.

In the present invention, the system events may be further refined by libraries or by the application itself to generate more specific events. As such, it is up to the application designer to provide the desired adaptation settings at a more refined level. For example, a system event NETWORK_CONT is sent by a system statistics server to the adaptation manager when network contention is detected. If an adaptation policy of the multimedia library is registered with the adaptation manager for the system event NETWORK_CONT, the adaptation manager will execute the adaptation policy to detect the problem in the video stream and the audio stream. If it is determined that the video stream is over-using the network bandwidth, the adaptation policy then send a VIDEO_STREAM_CONT event to the adaptation manager. The adaptation manager, upon receiving the VIDEO_STREAM_CONT event, calls another adaptation policy from the multimedia library that is registered for the VIDEO_STREAM_CONT event to adapt the video channel object to send only black and white images.

Further, in accordance with the present invention, adaptation policies are implemented by library designers and application designers to control the adaptation of adaptive objects. These policies use the adaptation manager services to get information on application adaptation features and modify the adaptive objects such as meta-space composition or adaptive method implementation. In the present invention, application designers may identify specific adaptation policies that relate to the adaptive methods or reflective methods with the keyword "DART_Policy." In addition, the designers may identify the specific adaptation events that are associated with the adaptation policy within the application source code. The DART compiler, upon pre-compiling the application source code, will generate the necessary low-level codes for associating the policy with the events. Further, whenever the application is started, the policies and the events are registered with the adaptation manager. It should be appreciated that, in the present invention, adaptation policies may be removed and installed by the adaptation manager during run-time.

Further, in the present invention, adaptation policies are classified in three different levels: system, middleware and application policies. In addition, each policy is part of a module. This is used to allow the user/application designer to readily select or inhibit some adaptation policies. For example, if a multimedia group communication protocol is used with its own adaptation policies, it may be better to inhibit adaptation policies of the generic group communication protocol.

Table 3 illustrates an exemplary implementation of a DART class that includes a DART policy in accordance with the present invention.

TABLE 3

```
DART_Class class Hello {
    public;
    Hello (char *name) }
        person = (char *)malloc(80);
        strcpy (person, name);
    }
    DART_Policy LangStrategy ( APP_LEVEL, 0 , LANG_EVENT);
    DART_Property print_fr (LANG_PROP, LANG_PROP_FR);
    DART_Property print_jp (LANG_PROP, LANG_PROP_JP);
    DART_Adaptive (print_jp) void print();
    DART_Implementation (print) void print_fr();
    DART_Implementation (print) void print_jp();
    private:
        char *person;
}
```

A simple class definition "Hello" that includes a DART adaptation policy "LangStrategy" is shown in Table 3. As shown, the adaptation policy is an application level (APP_LEVEL) policy, and is triggered upon receiving a "LANG_EVENT" adaptation event. The adaptation policy "LangStrategy" itself is provided by the application developer and may be written as a plain C function. In the present invention, the "LangStrategy" policy controls the adaptation manager to choose one of the implementations "print_fr" or "print_jp" of adaptive method "print" for all of the adaptive objects of the application.

Implementing Adaptation Policies Using DART Manager API

An adaptation policy in DART, in one implementation, is a plain C function that uses the adaptation manager to search for specific instances of a class (in case of a class related adaptation policies). Additionally, an adaptation policy may dictate the adaptation manger to search for specific properties in adaptive methods, and specific meta-objects in reflective methods. According to the present invention, in order to simplify the process of developing adaptive software, a set of adaptation manager application programming interfaces (API) are provided. A software developer may use the API to implement adaptation policies, to search for particular adaptive objects, to change the meta-space composition, to find a selector/reflector for an adaptive object, and to modify the reflectors/selectors of an adaptive object. The adaptation manager API of one embodiment of the present invention is included in Table 6.

Coordinating Adaptation Among Multiple Adaptive Objects

Figure 6:
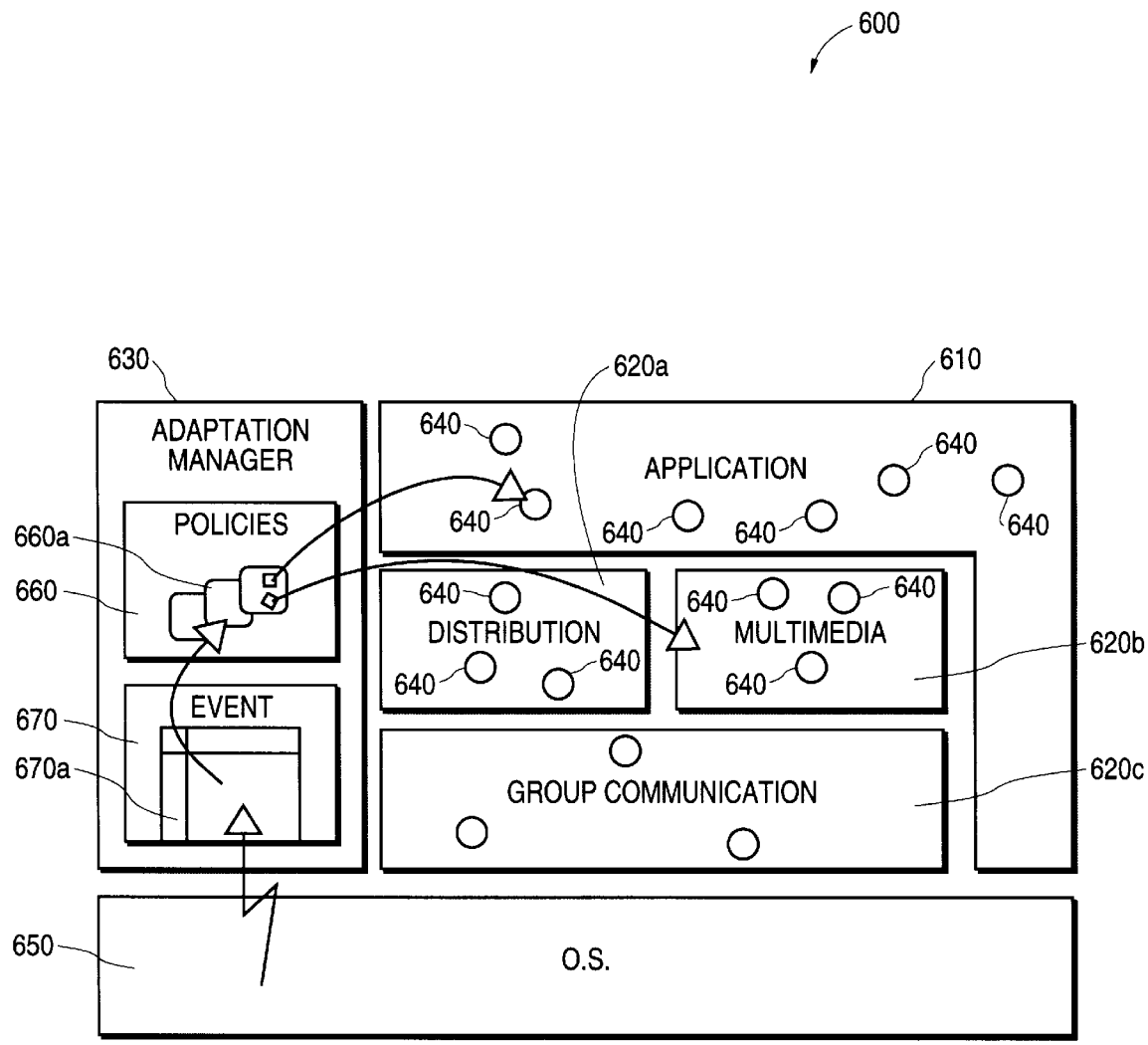
FIG. 6 is a logical block diagram illustrating an exemplary Distributed Adaptive Run-Time (DART) framework in accordance with one embodiment of the present invention.

FIG. 6 is a logical block diagram 600 illustrating an exemplary DART architecture in accordance with one embodiment of the present invention. As illustrated, exemplary DART framework 600 includes an application program 610, three libraries 620a–620c (e.g., Distribution library 620a, Multimedia library 620b, and Group Communication library 620c), adaptation manager 630, and operating system 650. The application program 610 and each of the three libraries 620a–620c contain adaptive objects 640 that are registered with the adaptation manager 630. Further, the adaptation polices 660 and adaptation events 670 are registered with the adaptation manager 630. In the present invention, the adaptation policies dictate the adaptation of the registered objects according to relevant adaptation events.

As illustrated in the exemplary embodiment, upon receiving a registered adaptation event 670a from operating system 650, adaptation manager 630 then looks up the appropriate adaptation policy 660a that correlates to the registered adaptive event 670a, and then executes adaptation policy 660a. The adaptation manager 630 then searches for, and selects, particular adaptive objects 640 within application program 610 and multi-media library 620b according to the adaptation policy 660a. In this way, adaptation of multiple adaptive objects are effectively and efficiently orchestrated.

As another example, assume the application program 610 has an adaptive object-class ARRAY that includes a network efficient implementation and a memory efficient implementation. The application designer may register with the adaptation manager 630 a MEM_LOW event and a memory policy that directs the adaptation manager 630 to select the memory efficient implementation in all instances of the object-class ARRAY upon detecting the MEM_LOW event. During run-time, the OS 650 may generate a MEM_LOW event. Then, the adaptation manager 630, upon receiving the MEM_LOW event, will then search for all instances of the object-class ARRAY, and will select the memory efficient implementation for each instance.

D. Building Distributed Applications Using Dart

While adaptation mechanisms are provided by the core DART platform, adaptive libraries provide additional services (e.g., adaptive classes, meta-level objects, and adaptation policies) to handle distribution. Distributed classes can readily be built if a distribution meta-space is provided that offers replicated objects, synchronization, and persistency. According to the present invention, a adaptive distribution library is provided with the DART platform. Implementation details of the adaptive distribution library can be found in "Distributed Objects for the DART Middleware," Sony DSL-USRL Technical Report, 1998, by Raverdy, P.-G.

The Replication Meta-Level Object

Meta-level objects provided in the Distribution library of the present invention offer easy access to distribution protocols. The main meta-level object controls base-object replication. Compared with group communication, replicated objects offer and intuitive and natural way to build distributed applications.

Particularly, the replication protocol of the present invention is composed of two independent layers. The lower layer deals with the communication and uses multicast protocol with an adaptive lightweight group protocol to allow the sharing of multicast groups by several replicated objects. The upper layer deals with the replication and controls sending updates, managing consistency, and updating the local replica. This layer implements several replication protocols (e.g., active and passive replication, master-proxy) to offer the best service to the base objects depending on the application needs. A generic interface between both layers accommodates different networks and replication schemes.

According to the present invention, the protocols that are implemented include: passive replication, active replication, and master-proxy. In passive replication, one replica (owner) at any given moment has the correct state of the base-object and has the access to the base object. If another replica wants to use the base-object, it will request the correct state from the owner replica, and use the base-object when the correct state is received. In active replication, each time an object is accessed, an update is sent to the other replicas. This update can either be function shipping (e.g., function name and parameters are sent, distant replicas have to perform locally the action), or data shipping (e.g., the new object state is sent, distant replicas just need to update their local copy. In master-proxy protocol, a master is responsible for managing object updates. Other replicas sending update requests, i.e., the method name they want to execute together with the parameters to the master copy.

The replication meta-level object uses some of the extra methods generated in the base class by the DART compiler at compile time to marshal and unmarshall the state of a replicated object. Thus, application designers only have to specify the DART replication meta-level object as the default meta-space to replicate a class, and do not have to write any code regarding sockets, object locking, initializing state or master election. However, they have to decide which methods and member variables should be replicated and which protocol to use. An exemplary application implemented using a replication meta-object according to the present invention is illustrated below in Table 4.

TABLE 4

| DART_Class | classSharedBoard | ( |
|---|---|---|
| | DART_Local Display | *my_display; |
| | OBJ_List | my_list(); |
| | DART_MSSetDefault | DART_LGP; |
| | SharedBoard(); | |
| | DART_Reflective void AddObj | (int x, int y, SharedObj obj); |
| | Redraw (); | |
| } | | |

As illustrated in Table 4, a meta-object "DART_LGP" is the default meta-object of the "SharedBoard" class. The "SharedBoard" class includes a reflective method "AddObj." In the present invention, during run-time, when reflective method "AddObj" is called, the "SharedBoard" object is replicated. In the present invention, the meta-object "DART_LGP" supports active function and data shipping, passive data shipping, and master-proxy protocol.

Figure 7:
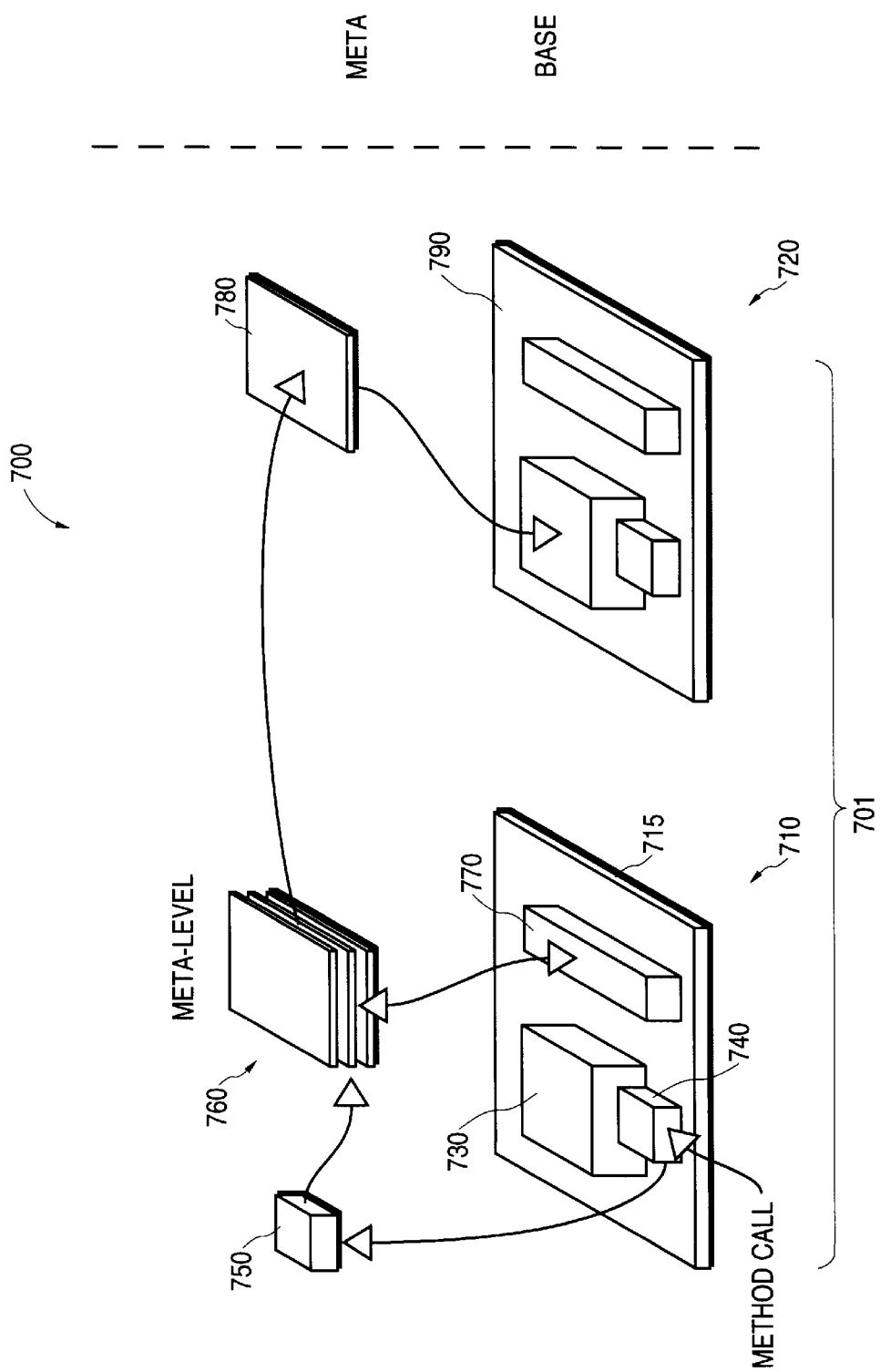
FIG. 7 is a logical block diagram illustrating the interactions of two replicas of a distributed object during replication in accordance with one embodiment of the present invention.

FIG. 7 is a block diagram 700 illustrating the interactions of two replicas of a distributed object during replication. As illustrated, FIG. 7 shows a distributed object 701 with two replicas 710 and 720. Replica 710 includes a base object 715, three meta-level objects 760, a reflector 750, a meta-wrapper 740, a reflective method 730, and an extra method 770. Replica 720 is analogous to replica 710, and includes a base object 790 and one meta-object 780.

In operation, when reflective method 730 of replica 710 is called, the meta-wrapper 740 calls the reflector 750 that in turn calls the different meta-level objects 760. The selected one of the meta-level objects 760 controlling replication uses local extra methods generated by the DART compiler to get the object's state and sent it to the other replica 720. The receiving meta-level object 720 then updates its local base object with the new state. Thus, distributed object 760 is readily and automatically replicated. In this way, a developer for distributed applications may take advantage of the different adaptation mechanisms offered by the present software platform to implement complex distributed applications with minimal effort.

According to the present invention, an adaptation manager can be used to manage adaptations of the replication meta-level objects 710 and 720 at run-time. An adaptation policy for replication may be registered with the adaptation manager such that, upon detecting an event, the adaptation policy calls the adaptation manager to change the composition of the replication meta-space. In this way, replication protocols may be dynamically changed during run-time.

For example, a distributed application may use an active replication meta-object as its default protocol for replication. According to one embodiment of the present invention, the distributed application may include an adaptation policy that modifies the meta-space to include a passive replication meta-object upon detecting a sudden change in network bandwidth or usage. Significantly, according to the present invention, adaptation would be performed automatically without requiring the application designer to write codes that deal with adaptation. Rather, adaptation services are already built into the run-time software environment.

According to the present invention, an adaptation manager can be used to manage adaptations of the replication meta-level objects 710 and 720 at run-time. An adaptation policy for replication may be registered with the adaptation manager such that, upon detecting an event, the adaptation policy will call the adaptation manager to change the composition of the replication meta-space. In this way, different replication protocols can be used in different network environments without requiring the application designer to write special codes that deal with adaptation.

The present invention, a distributed adaptive run-time (DART) software environment, has thus been described. Within the DART environment, application behavior, properties and needs, environment features, and adaptation policies can be designed independently. In addition, the DART environment is augmented with several adaptation mechanisms and a generic mechanism for adaptation management. Interoperability between independent adaptive objects is achieved by using adaptive events and policies. Another advantage of the present invention is that details of the adaptation are hidden from the application developers.

As another advantageous feature of the present invention, the DART compiler generates the adaptation control structure and initializes the platform components. The generated code (e.g., introspection and alteration methods at the base level) introduces basic functionalities that can be dynamically combined at run-time to perform complex actions (e.g., replication, and persistency). Furthermore, application designers benefit from the very fine-grain control of the class composition as each method and variable of a class can be extended independently. Using the present software runtime environment, application authors would be able to quickly develop distributed software, such as network or web software, without having to deal with the details of the distribution technology.

It should be appreciated that, while the present invention has been described in particular embodiments, the present invention should not be construed as limited by such embodiments, but rather construed according to the below claims.

TABLE 5

```
###############################################
# 4268 "Counter.ii"
class Counter {
    private :
    int cpt ;
// These three new member variables are added by the dart
// compiler and correspond to
//              - the unique object ID given to the DART object
//              - a pointer to the intermediate structure that
//                holds the un/marshalling
//              - a pointer to the reflector associated with the
//                base object
    ObjectID    *Dart_id;
    MetaClass   *Dart_mc;
    Reflector   *Dart_reflector;
        Counter ( ) ;
        // For each reflective method X, a new method BaseLevelX is
        // added to the class. The code of the BaseLevelX method will
        // be the one written by the class designer for the method X.
        // The method X has a new body that contains the calling code
        // to the meta-level (see below)
        void BaseLevelIncr ( ) ;
        void BaseLevelDecr ( ) ;
        int BaseLevelVal ( ) ;
        void BaseLevelSet ( int val )
// This is the new code for the Incr method. First, create
// a bitstring with:
//    an identifier for the intermediate structure to use,
//    the method number, and
//    the parameters (in the case of this method,
//                  there is no parameter)
// After the bitstring is complete, the Reflector of the
// object is called to perform the Before call on all the
// meta-objects.
// A CallBefore is done with providing to the meta-objects
// the bitstring containing the method name and call
// parameters, along with the base-object ID. The return code
// of the CallBefore is used to decide whether or no the
// base-level code of the method should be executed.
// After that step, the CallAfter is performed with the same
// parameters as the CallBefore.
// Finally, if a meta-space call returned a valid return
// code, it is returned, otherwise, the return code of the
// base-level call is used (in this case, no return code is
// associated with this method)
    void    Incr () {
        void *tmp_res=0, *tmp_res2=0;
        u_char *msg_, *msg_0_;
        msg_0 = new u_char[ 40000 ]; msg_ = msg_0_;
        msg_ += Dart_mc->marshall_mc(msg_, 0);
        *((int *)msg_) = 0 ;
        msg_ += sizeof(int);
        tmp_res = Dart_reflector-
>CallBefore (Dart_id,0,msg_0_, (msg_ - msg_0_) , 0 );
        if (tmp_res==0) {this->BaseLevelIncr();}
        tmp_res2 = Dart_reflector->CallAfter (Dart_id,
0,msg_0_, (msg_ - msg_0_) , 0 );
        free ((void. *)msg_0_);
    };
    void    Decr () {
        void *tmp_res=0, *tmp_res2=0;
        u_char *msg_, *msg_0_;
```

TABLE 5-continued

```
        msg_0_ = new u_char[ 40000 ]; msg_ = msg_0_;
        msg_ += Dart_mc->marshal_mc(msg_, 0);
        *((int*)msg_) = 1
        msg_ += sizeof(int);
        tmp_res = Dart_reflector-
>CallBefore(Dart_id,0,msg_0_, (msg_ - msg_0_) ,0 );
        if (tmp_res==0) {this->BaseLevelDecr() ;}
        tmp_res2.= Dart_reflector->CallAfter (Dart_id,
0,msg_0_, (msg_ - msg_0_),0 );
        free ((void *)msg_0_);
    };
// In this case, a return code (integer) is associated with
// the method. If a valid pointer is received form the
// meta-level calls (either before or after), the void *
// pointer is cast to the correct format.
    int     Val () {
        int res; void *tmp_res=0,*tmp_res2=0;
        u_char *msg_, *msg_0_;
        msg_0_ = new u_char[ 40000 ]; msg_ = msg_0_;
        msg_ += Dart_mc->marshall_mc(msg_, 0);
        *((int *)msg_) = 2 ;
        msg_ += sizeof(int);
        tmp_res = Dart_reflector-
>CallBefore (Dart_id, 0,msg_0_, (msg_- msg_0_) , 1 );
        if* (tmp_res==0) {res = this->BaseLevelVal();}
        tmp_res2 = Dart_reflector->CallAfter (Dart_id,
0,msg_0_, (msg_- msg_0_) , 1 );
        free ((void *)msg_0_);
        if (tmp_res!=0) {free ((void *)tmp_res2);return (*((
int *)tmp_res));}
        if (tmp_res2!=0) (return (*(( int *)tmp_res2));}
        return (res);
    };
// In this case, no return value is expected but there is a
// parameter. Thus, when creating the bitstring, the value
// of the int is added after the method identifier. There is
// no description of the format of the bitstring (except for
// the intermediate structure and the method identifiers)
    void    Set ( int val ) {
        void *tmp_res=0,*tmp_res2=0;
        u_char *msg_, *msg_0_;
        msg_0_ = new u_char[ 40000 ]; msg_ = msg_0_;
        msg_ += Dart_mc->marshall_mc(msg_, 0);
        *((int *)msg_) = 3
        msg_ += sizeof(int);
        memcpy(msg_, &val, sizeof( int ));
        msg_ += sizeof( int );
        tmp_res = Dart_reflector-
>CallBefore (Dart_id, 0,msg_0_, (msg_ - msg_0_) , 0 );
        if (tmp_res==0) {this->BaseLevelSet( val );}
        tmp_res2 = Dart_reflector->CallAfter (Dart_id,
0,msg_0_, (msg_ - msg_0_) , 0 );
        free ((void *)msg_0_);
// After the wrappers for the reflective methods, the DART
// compiler is also generating automatically methods in the
// class to marshall and unmarshall the object (create a
// bitstring from an object state and vice-versa.
// The first method allows the object to create a bitstring
// from the object state. Here, the bitstring is only
// composed of the integer containing the counter value.
    static u_char* marshall(void* obj, u_char* p, size_t len)
    {
        Counter* b = (Counter*)obj;
        *((int *)p) = b->cpt;
        p += sizeof( int );
        len -= sizeof( int );
        return p;
    }
// This method initializes the state of the object from a
// bitstring.
    static u_char* unmarshall_rec(void* pobj, u_char* p,
size_t len) {
        Counter *obj = (Counter *)pobj;
        obj->cpt = *(int) (*(( int *)p));
        p += sizeof( int );
        len -= sizeof( int );
        return p;
    }
// This method takes a parameter bitstring and performs the
```

TABLE 5-continued

```
// call to the correct method with the correct parameters.
static size_t  unmarshall_func(void * vobj,
                                                u_char *p
                                                u char *r,
                                                size_t len) {
        Counter_*.obj = *(Counter *)vobj;
        u_char* *r0 = r;
        int methid = *((int *)p);
        p += *sizeof(int);
        switch (methid) {
                case 0: {
                        obj ->BaseLevelIncr ();
                        break;
                }
                case 1: {
                        obj ->BaseLevelDecr ();
                        break;
                }
                case 2: {
                        int retval = obj->BaseLevelVal();
                        if(r) {
                                memcpy(r, &retval, sizeof( int ));.
                                r += sizeof ( int );
                        }
                        break;
                }
                case 3: {
                        int p0 ;
                        memcpy(&p0, p, sizeof( int ));
                        p += sizeof(p0);
                        obj ->BaseLevelSet (p0);
                        break;
                }
                default:
                        break;
        }
        return r-r0;
};
// Another important part rewritten by the DART compiler is
// the constructor of the class. The original constructor is
// first executed, and after all the instructions for the
// adaptive object are initialized.
// - initialization of the unique identifier of the object
```

TABLE 5-continued

```
// - initialization of the intermediate structure
// - creation of the reflector.
// Then, a reference to the DART manager is obtained, and
// register the currently created object (together with
// it's ID, intermediate structure class name and
// reflector). It is during the registration that the DART
// manager checks for the given class and the configuration
// of the meta-space, and eventually creates the requested
// meta-object.
Counter::Counter() {
// original constructor
        {
                cpt = 0 ;
        }
// added instructions
        Dart_id = & (ObjectID::get_unique()) ;
        Dart_mc = new MetaClass ( "Counter",
                                         marshall, unmarshall, unmarshall_func );
        Dart_reflector = new (Reflector);
        AdapManager *Dart_M;
        Dart_M = GetAdapManager();
        Dart_M->RegisterObject ( (void *)this,
                                        Dart_id, Dart_mc,
        "Counter",Dart_reflector);
};
// Below are the original code for the reflective methods
void    Counter::BaseLevelIncr () {
        cpt++;
}
void    Counter: :BaseLevelDecr ( ) {
        cpt--;
}
int     Counter::BaseLevelVal () {
        return(cpt);
void    Counter: :BaseLevelSet (int val) {
        cpt=val;
}
##################################################
```

TABLE 6

```
/ ********************************************************** /
/* This file give some of the API provided by the DART
manager for writing adaptation policies. */
/ ********************************************************** /
/ ********************************************************** /
class AdapManager {
/ ********************************************************** /
        /* allow to find a given meta-object given base-object
unique identifier */
MetaObject *FindMetaObject ( int mo_id, ObjectID *obj_id );
/ ********************************************************** /
/* add and remove a specific meta-object to an instance of
an object */
        int AdMetaObject (ObjectID *obj_id, int meta_obj_type);
        int RemoveMetaObject (ObjectID *obj_i_, int meta_obj_type);
        int AddMetaObject (char*class_name, int meta_obj_type, int
flag);
        int RemoveMetaObject (char *class_name, int meta_obj_type,
int flag);
/ ********************************************************** /
        /* clear the meta-space of a base-object (removes all it's
meta-object) */
        int ClearMetaSpace (ObjectID *obj_id);
        int ClearMetaSpace (char *class_name, int flag);
/ ********************************************************** /
        /* build a group of adaptive objects by sharing the meta-
space */
        int TransferMeta (AdapObject *tmp_dest, AdapObject
*tmp_src);
        int TransferMeta (ObjectID *id_dest, ObjectID *id_src);
```

TABLE 6-continued

```
/ ************************************************************ /
    /* make a base-object_uses it's own meta-objects if in a
group before */
    int DisconnectMeta (AdapObject *tmp_obj);
    int DisconnectMeta. (ObjectID *obj_id);
/ ************************************************************ /
    /* build a group of adaptive objects by sharing the
selectors */
    * int ShareSelectors ( AdapObject *obj1, AdapObject *obj2);
/ ************************************************************ /
    /* makes an object use its own selector for adaptive
methods (leaves the group) *;/
    int LocalSelectors ( AdapObject *obj1);
/ ************************************************************ /
    /* register an adaptation pblicy in the DART manager */
    int RegisterAdaptation (int event_nb, int level_id, int
mod_id,
            void ((*fn).(AdapManager *, ObjectID
* ,int,int argc, char *argv[ ])),
            int flag);
    /* activate/deactivate a set of adaptation policies from a
module */
    int *SetModule (int action, int module);
    /* activate/desactivate an adaptation policy */
    int SetFn (int action, void ((*fn) (AdapManager *, ObjectID
* ,int,int argc, char *argv[ ]));
    /* activate/desactivate a set of policies for a level
(system/lib/application)
        and/or the one that react on a given event /*
    int SetLevel (int action, int level_id, int event_nb);
    /* inhibit an event from being fired */
    int DeleteEvent (int event_nb);
/ ************************************************************ /
    /* return a list of function names given different
parameters (property, class name) */
    List *GetFunctions (int prop, char *class_name);
    /* return a list of selectors given different parameters */
    List *GetSelectors (List *objs, char *class_name, char
*fn_name);
    /* return a list containing one/all instances of a given
adaptive class */
    List *GetObjects (ObjectID *obj_id, char *class_name);
    /* return the default implementation to use for an adaptive
method of a class */
    int GetDefault (char *class_name, char *fn_name);
    /*. set the value of the selector (for all instance of a
class and for a given function) */
    int SetSelectors (char*class_name, char *fn_name, int
value);
    /* set the value of the selector (for all selectors in the
list) */
    int SetSelectors (List *sels, int value);
    /* activate/desactivate a given type of meta-object for a
list of base-object) */
    SetMetaObject (List. *objs, int mo_id, int op);
};
```

What is claimed is:

1. A process for providing coherent run-time adaptation mechanisms for an adaptive software application program, the process comprising the steps of:

a) instantiating a first adaptive class of said adaptive software application program to create a first adaptive object, said first adaptive object residing within memory units of said computer system, said first adaptive object having a first adaptive method, wherein said first adaptive method comprises a plurality of first implementations;

b) said first adaptive object generating a first selector, said first selector residing within said memory units, and wherein said first selector selects a first one of said plurality of first implementations by default;

c) in response to a change in execution environment of said adaptive software application program, adapting said first adaptive object by modifying said first selector to select a second one of said plurality of first implementations.

2. The process as recited in claim 1 further comprising the steps of:

d) instantiating a second adaptive class of said adaptive software application program to create a second adaptive object, said second adaptive object residing within memory units of said computer system, said second adaptive object having a second adaptive method, wherein said second adaptive method comprises a plurality of second implementations;

e) said second adaptive object generating a second selector, said second selector residing within said memory units, and wherein said second selector selects a first one of said plurality of second implementations by default; and f) in reponse to said change in execution environment of said adaptive software application program, adapting said second adaptive object by modifying said second selector to select a second one of said plurality of second implementations.

3. The process as recited in claim 2 wherein said step (c) further comprises the steps of:

generating an adaptation event according said change in execution environment of said adaptive software application program; and modifying said first selector according to a predetermined adaptation policy and said adaptation event.

4. The process as recited n claim 3 wherein said step (f) further comprises the step of modifying said second selector according to a said predetermined adaptation policy and said adaptation event.

5. The process as recited in claim 4 wherein said adaptation policy stores information correlating said first adaptive class, said second adaptive class and said adaptation event.

6. The process as recited in claim 3 further comprising the steps of:

instantiating a third adaptive class of said adaptive software application program to generate a third adaptive object, said third adaptive object having a reflective method and a meta-space;

said third adaptive object generating a reflector, said reflector for defining said meta-space; and adapting said third adaptive object by modifying said reflector to alter said meta-space according to said adaptation policy and in response to said adaptation event.

7. A process for providing coherent run-time adaptation mechanisms for an adaptive software application program, the process comprising the steps of:

a) instantiating an adaptive class of said adaptive software application program to create a first adaptive object, said first adaptive object residing within memory units of said computer system, said first adaptive object having a first adaptive method, wherein said first adaptive method comprises a plurality of first implementations;

b) instantiating said adaptive class to create a second adaptive object, said second adaptive object residing within said memory units of said computer system, said second adaptive object having a second adaptive method, wherein said second adaptive method comprises a plurality of second implementations;

c) said first adaptive object generating a first selector, said first selector residing within said memory units, and wherein said first selector selects a first one of said plurality of first implementations;

d) said second adaptive object generating a second selector, said second selector residing within said memory units, and wherein said second selector selects a first one of said plurality of second implementations;

e) in response to a change in execution environment of said adaptive software application program, said first selector selecting a second one of said plurality of first implementations and said second selector selecting a second one of said plurality of second implementations.

8. The process as recited in claim 7 further comprising the step of providing an adaptation manager for controlling adaptation of said first adaptive object and said second adaptive object.

9. The process as recited in claim 8 wherein said step (e) further comprises the steps of:

generating an adaptation event according said change in execution environment of said adaptive software application program; and said adaptation manager modifying said first selector to select said first one of first implementations according to said predetermined adaptation policy and said adaptation event; and said adaptation manager modifying said second selector to select said second one of said second implementations according to said predetermined adaptation policy and said adaptation event.

10. The process as recited in claim 8 wherein said adaptation policy provides information correlating said first and second adaptive classes and said adaptation event to said adaptation manager.

11. A process for providing coherent run-time adaptation mechanisms for an adaptive software application program, the process comprising the steps of:

a) instantiating a first adaptive class of said adaptive software application program to generate a first adaptive object, said first adaptive object having a first reflective method and a first meta-space;

b) said first adaptive object generating a first reflector, said reflector for defining said first meta-space; and c) instantiating a second adaptive class of said adaptive software application program to generate a second adaptive object, said second adaptive object having a second reflective method and a second meta-space;

d) said second adaptive object generating a second reflector, said reflector for defining said second meta-space;

e) in response to a change in execution environment of said adaptive software application program, altering said first meta-space and said second meta-space according to a predetermined adaptation policy and said adaptation event by modifying said first reflector and said second reflector.

12. The process as recited in claim 11 further comprising the step of providing an adaptation manager for controlling adaptation of said first adaptive object and said second adaptive object.

13. The process as recited in claim 12 wherein said step (e) further comprises the steps of:

generating an adaptation event according said change in execution environment of said adaptive software application program; and said adaptation manager modifying said first reflector to alter said first meta-space according to said predetermined adaptation policy and said adaptation event; and said adaptation manager modifying said second selector to alter said second meta-space according to said predetermined adaptation policy and said adaptation event.

14. The process as recited in claim 12 wherein said adaptation policy provides information correlating said first and second adaptive classes and said adaptation event to said adaptation manager.

15. A system for providing run-time adaptation mechanisms for an adaptive software application program, the system comprising:

a) means for instantiating a first adaptive class of said adaptive software application program to create a first adaptive object, said first adaptive object residing within memory units of said computer system, said first adaptive object having a first adaptive method, wherein said first adaptive method comprises a plurality of first implementations, and wherein said first adaptive object creates a first selector for selecting a first one of said first implementations when instantiated;

b) means for storing predetermined adaptation policies associating adaptive classes to adaptation events; and c) means for generating an adaptation event in response to a change in execution environment of said adaptive software application program;

d) an adaptation managing means for controlling adaptation of said first adaptive object, wherein said adaptation managing means selects a second one of said plurality of first implementations according to a predetermined adaptation policy and said adaptation event by modifying said first selector upon receiving said adaptation event.

16. The system as recited in claim 15 further comprising:

means for instantiating a second adaptive class of said adaptive software application program to create a second adaptive object, said second adaptive object residing within memory units of said computer system, said second adaptive object having a second adaptive method, wherein said second adaptive method comprises a plurality of second implementations, and wherein said second adaptive object creates a second selector for selecting a first one of said second implementations when instantiated, wherein said adaptation managing means selects a second one of said plurality of second implementations according to said predetermined adaptation policy and said adaptation event by modifying said second selector upon receiving said adaptation event.

17. The system as recited in claim 15 further comprising:

means for instantiating a third adaptive class to generate a third adaptive object, said third adaptive object having a reflective method and a meta-space, wherein said third adaptive object creates a reflector for defining said meta-space for said third adaptive object when instantiated, wherein said adaptation manager modifies said reflector to change said meta-space according to said adaptation policies and said adaptation event upon receiving said adaptation event.

18. The system as recited in claim 15 wherein said adaptation policy provides information correlating said first adaptive class and said adaptation event to said adaptation managing means.

19. The process as recited in claim 18 wherein said adaptation managing means further comprises means for searching for instances of said first adaptive class upon receiving said adaptation event.

* * * * *